(12) United States Patent
Ma et al.

(10) Patent No.: US 12,395,058 B2
(45) Date of Patent: Aug. 19, 2025

(54) FRAME-TYPE BILATERAL REVERSE PERMANENT MAGNET DIRECT CURRENT LINEAR MOTOR

(71) Applicant: Guangdong University of Technology, Guangzhou (CN)

(72) Inventors: Ping Ma, Guangzhou (CN); Heng Ding, Guangzhou (CN); Tengfei Deng, Guangzhou (CN); Hao Chen, Guangzhou (CN); Hongda Zhao, Guangzhou (CN); Xinghua Wang, Guangzhou (CN); Yongsheng Ye, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 342 days.

(21) Appl. No.: 18/299,924

(22) Filed: Apr. 13, 2023

(65) Prior Publication Data
US 2024/0048037 A1    Feb. 8, 2024

(30) Foreign Application Priority Data

Aug. 2, 2022 (CN) .......................... 202210924653.3

(51) Int. Cl.
*H02K 41/035* (2006.01)
*H02K 1/17* (2006.01)
*H02K 1/34* (2006.01)

(52) U.S. Cl.
CPC ............. *H02K 41/035* (2013.01); *H02K 1/17* (2013.01); *H02K 1/34* (2013.01)

(58) Field of Classification Search
CPC .......... H02K 41/035; H02K 1/17; H02K 1/34; H02K 7/09; H02K 41/031
See application file for complete search history.

(56) References Cited

FOREIGN PATENT DOCUMENTS

| DE | 10231190 A1 * | 3/2003 | ............. H02K 41/03 |
|----|---------------|--------|--------------------------|
| JP | 2003018818 A * | 1/2003 | |

OTHER PUBLICATIONS

English translation of DE-10231190-A1 (Year: 2003).*

(Continued)

*Primary Examiner* — Tulsidas C Patel
*Assistant Examiner* — Joshua Kiel M Rodriguez
(74) *Attorney, Agent, or Firm* — Hemisphere Law, PLLC; Zhigang Ma (57) ABSTRACT

A frame-type bilateral reverse permanent magnet direct current linear motor is provided, including a support frame, an iron yoke assembly with a first iron yoke, a second iron yoke and a middle iron yoke, a permanent magnet group, a coil winding and a pole piece assembly. Two groups of intermediate transition permanent magnet assemblies are disposed between the first iron yoke and the middle iron yoke and between the second iron yoke and the middle iron yoke. The intermediate transition permanent magnet assemblies includes transition permanent magnets and corresponding transition connection iron yokes; and magnetic pole orientations of the transition permanent magnets of the two groups of intermediate transition permanent magnet assemblies are reverse. The linear motor realizes efficient direct-current linear control, and has a high speed, a precise controllability, a high thrust density and small thrust fluctuation, and easiness in assembling.

7 Claims, 6 Drawing Sheets

(56) References Cited

OTHER PUBLICATIONS

English translation of JP-2003018818-A (Year: 2003).*
Guangdong University of Technology (Applicant), Replacement claims (allowed) of CN202210924653.3, Jul. 8, 2024.
CNIPA, Notification to grant patent right for invention in CN202210924653.3, Jul. 11, 2024.

* cited by examiner

FRAME-TYPE BILATERAL REVERSE PERMANENT MAGNET DIRECT CURRENT LINEAR MOTOR

TECHNICAL FIELD

The disclosure relates to direct current linear motors, and particularly to a frame-type bilateral reverse permanent magnet direct current linear motor.

BACKGROUND

Linear motors belong to one of important means to achieve high-precision linear feed motions. The linear motors can be divided into various types, such as an alternating current (AC) linear induction motor (also referred to as LIM), an AC permanent magnet linear synchronous motor (also referred to as PMLSM), a direct current (DC) linear motor, a linear stepper motor, and a hybrid linear motor. In the evolution process from AC rotary motors to AC linear motors, because of an end effect of the linear motors with open structures, it is easy to cause periodic loss of magnetic circuit, resulting in thrust fluctuation. Compared with a coreless permanent magnet linear motor and the linear induction motor, a permanent magnet linear motor with a cogging structure using ferromagnetic material as a core can obtain a higher thrust density, but a cogging effect also causes thrust fluctuation occurred on the linear motor.

SUMMARY

An objective of the disclosure is to provide a frame-type bilateral reverse permanent magnet direct current linear motor to overcome at least some of defects in the related art. The frame-type bilateral reverse permanent magnet direct current linear motor can address the end effect and thrust fluctuation of the traditional linear motor with open structure.

Technical solutions for solving the above technical problems are as follows.

A frame-type bilateral reverse permanent magnet direct current linear motor is provided by the disclosure, including a support frame, an iron yoke assembly disposed on the support frame, a permanent magnet group, a coil winding, and a pole piece assembly.

In an embodiment, the iron yoke assembly includes a first iron yoke, a second iron yoke, and a middle iron yoke; the first iron yoke, the second iron yoke and the middle iron yoke are disposed in parallel pairwise; permanent magnets of the permanent magnet group are disposed between the first iron yoke and the middle iron yoke and between the second iron yoke and the middle iron yoke; pole pieces of the pole piece assembly are disposed on surfaces of the permanent magnets; and the coil winding is sleeved on the middle iron yoke.

In an embodiment, the frame-type bilateral reverse permanent magnet direct current linear motor provided by the disclosure further includes a plurality of intermediate transition permanent magnet assemblies, disposed between the first iron yoke and the middle iron yoke and between the second iron yoke and the middle iron yoke. The plurality of the intermediate transition permanent magnet assemblies are two groups of intermediate transition permanent magnet assemblies, one group of intermediate transition permanent magnet assemblies are disposed on two sides of a region between the first iron yoke and the middle iron yoke and serve as first intermediate transition permanent magnet assemblies, and the other group of intermediate transition permanent magnet assemblies are disposed on two sides of a region between the second iron yoke and the middle iron yoke and serve as second intermediate transition permanent magnet assemblies. Each of the plurality of intermediate transition permanent magnet assemblies includes a transition permanent magnet and transition connection iron yokes respectively disposed on two sides of the transition permanent magnet. The transition connection iron yokes respectively disposed on the two sides of the transition permanent magnet of each of the plurality of intermediate transition permanent magnet assemblies are located between the first iron yoke and the middle iron yoke or between the second iron yoke and the middle iron yoke. A magnetic pole orientation of the transition permanent magnet of each of the first intermediate transition permanent magnet assemblies is reverse to a magnetic pole orientation of the transition permanent magnet of each of the second intermediate transition permanent magnet assemblies.

Specially, the permanent magnets of the permanent magnet group include four permanent magnets respectively being a first permanent magnet, a second permanent magnet, a third permanent magnet and a fourth permanent magnet; the first permanent magnet is arranged opposite to the second permanent magnet, and magnetic poles on respective surfaces of the first permanent magnet and the second permanent magnet facing towards each other are different; the third permanent magnet is arranged opposite to the fourth permanent magnet, and magnetic poles on respective surfaces of the third permanent magnet and the fourth permanent magnet facing towards each other are different; and the first permanent magnet is disposed on the first iron yoke, the second permanent magnet is disposed on the middle iron yoke, the third permanent magnet is disposed on the middle iron yoke, and the fourth permanent magnet is disposed on the second iron yoke.

Specially, the pole pieces of the pole piece assembly include a first pole piece, a second pole piece, a third pole piece and a fourth pole piece; and the first pole piece, the second pole piece, the third pole piece and the fourth pole piece are respectively disposed on the first permanent magnet, the second permanent magnet, the third permanent magnet and the fourth permanent magnet.

Specially, each of the iron yoke assembly, the transition connection iron yokes and the pole piece assembly is made of a high-permeability soft-magnetic material.

Specially, each of the permanent magnet group and the transition permanent magnets is made of a high-coercivity hard-magnetic material, and has a magnetization direction being a normal direction of a surface with a maximum surface area.

Specially, contact locations of the first iron yoke, the second iron yoke and the middle iron yoke with the plurality of intermediate transition permanent magnet assemblies are provided with stepped grooves.

Specially, the first intermediate transition permanent magnet assemblies are two in number, the two first intermediate transition permanent magnet assemblies are respectively located on the two sides of the region between the first iron yoke and the middle iron yoke, and thereby the two first intermediate transition permanent magnet assembly, the first iron yoke and the middle iron yoke cooperatively form a closed frame structure; and correspondingly the second intermediate transition permanent magnet assemblies are two in number, the two second intermediate transition permanent magnet assemblies are respectively located on the two sides of the region between the second iron yoke and the middle iron yoke, and thereby the two second intermediate transition permanent magnet assemblies, the second iron yoke and the middle iron yoke cooperatively form another closed frame structure.

Specially, the support frame is an aluminum alloy frame.

Specially, the coil winding includes a coil rack and an enameled copper wire wound on the coil rack; and the coil rack includes a left vertical plate, a right vertical plate, an upper connecting plate and a lower connecting plate; and the left vertical plate, the right vertical plate, the upper connecting plate and the lower connecting plate are welded together to form a frame structure; and a length and a width of an inner hole of the coil rack are both greater than a length and a width of a cross section of the middle iron yoke, respectively.

Compared with the related art, the disclosure has the following beneficial effects:

1. The frame-type bilateral reverse permanent magnet direct current linear motor of the disclosure realizes efficient direct-current linear control, and has the advantages of high speed, high precision, and controllability. Meanwhile, a transition connection process of the permanent magnets (i.e., providing two groups of the intermediate transition permanent magnet assemblies) also reduces manufacturing difficulty and facilitates an overall assembly of the motor.

2. The iron yoke assembly and the intermediate transition permanent magnet assembly together form a closed structure, and a set of bilateral reverse uniform magnetic fields are formed between the first iron yoke and the middle iron yoke and between the second iron yoke and the middle iron yoke. Therefore, the bilateral reverse uniform magnetic fields are used to drive the coil winding to achieve linear feed motion. Furthermore, the end effect existing in the conventional linear motor due to the open structure can be ignored because of forming the closed structure.

3. The pole pieces in the frame-type bilateral reverse permanent magnet direct current linear motor of the disclosure make the generated bilateral reverse magnetic fields uniform.

4. The frame-type bilateral reverse permanent magnet direct current linear motor with the closed structure of the disclosure uses the transition connection iron yokes and the transition permanent magnets to connect the first iron yoke and the second iron yoke individually with the middle iron yoke, thereby to form a frame-type closed structure, thereafter the frame-type bilateral reverse permanent magnet direct current linear motor with the closed structure can solve the problems of the end effect and the thrust fluctuation existing in the traditional linear motor with open structure.

5. The frame-type bilateral reverse permanent magnet direct current linear motor with the closed structure provided by the disclosure adopts a frame-type closed structure to eliminate the end effect, and adopts a special coil rack structure to reduce its effect on the uniform magnetic fields between the pole pieces, thereby achieving a low thrust fluctuation.

6. The frame-type bilateral reverse permanent magnet direct current linear motor with the closed structure provided by the disclosure is driven by the direct current, thereby possessing a well linear controllability. In addition, the frame-type closed bilateral reverse permanent magnet direct current linear motor of the disclosure is symmetrically driven by the bilateral thrust, thereby possessing a high thrust density. The above features make the frame-type closed bilateral reverse permanent magnet direct current linear motor of the disclosure easy to achieve the linear feed motion with high speed and high thrust density.

7. The frame-type closed bilateral reverse permanent magnet direct current linear motor of the disclosure can ignore the end effect, and weaken the impact of magnetic field fluctuations. The linear motor is insensitive to air-gap thickness, low in difficulty of its machining technology, convenient to assemble, and symmetrically driven by the bilateral thrust. Therefore, the linear motor has the advantages of high thrust density, well linear controllability, high precision, well stability, and etc.

DESCRIPTION OF REFERENCE NUMERALS

1A—first iron yoke; 1B—second iron yoke; 2A—first permanent magnet; 2B—second permanent magnet; 2C—third permanent magnet; 2D—fourth permanent magnet; 3—coil winding; 4A—first pole piece; 4B—second pole piece; 4C—third pole piece; 4D—fourth pole piece; 5A—5D—transition permanent magnet; 6—middle iron yoke; 7A—7H—transition connection iron yoke; 8—coil rack; 8A—left vertical plate; 8B—right vertical plate; 8C—upper connecting plate; 8D—lower connecting plate.

DETAILED DESCRIPTION OF THE EMBODIMENTS

The disclosure is further described below with reference to embodiments and attached drawings, but implementations of the disclosure are not limited thereto.

Referring to FIG. 1 to FIG. 9, a frame-type closed bilateral structure of the disclosure can effectively eliminate an influence of an end effect on motor thrust. In an illustrated embodiment of the disclosure, a frame-type bilateral reverse permanent magnet direct current linear motor is provided by the disclosure, including: a support frame, an iron yoke assembly disposed on the support frame, a permanent magnet group, a coil winding 3, and a pole piece assembly.

Referring to FIG. 1 to FIG. 9, the iron yoke assembly includes a first iron yoke 1A, a second iron yoke 1B, and a middle iron yoke 6; and the first iron yoke 1A, the second iron yoke 1B and the middle iron yoke 6 are disposed in parallel pairwise. Permanent magnets of the permanent magnet group are disposed between the first iron yoke 1A and the middle iron yoke 6 and between the second iron yoke 1B and the middle iron yoke 6. Poles pieces of the pole piece assembly are disposed on surfaces of the permanent magnets. The coil winding 3 is sleeved on the middle iron yoke 6.

Referring to FIG. 1 to FIG. 9, the permanent magnets of the permanent magnet group include four permanent magnets respectively being a first permanent magnet 2A, a second permanent magnet 2B, a third permanent magnet 2C and a fourth permanent magnet 2D. The first permanent magnet 2A is arranged opposite to the second permanent magnet 2B, and magnetic poles on respective surfaces of the first permanent magnet 2A and the second permanent magnet 2B facing towards each other are different. The third permanent magnet 2C is arranged opposite to the fourth permanent magnet 2D, and magnetic poles on respective surfaces of the third permanent magnet 2C and the fourth permanent magnet 2D facing towards each other are also different. The first permanent magnet 2A is disposed on the first iron yoke 1A, the second permanent magnet 2B is disposed on the middle iron yoke 6 (i.e., a side of the middle iron yoke 6 facing towards the first iron yoke 1A), the third permanent magnet 2C is disposed on the middle iron yoke 6 (i.e., the other side of the middle iron yoke 6 facing towards the second iron yoke 1B), and the fourth permanent magnet 2D is disposed on the second iron yoke 1B.

Referring to FIG. 1 to FIG. 9, the pole pieces of the pole piece assembly include a first pole piece 4A, a second pole piece 4B, a third pole piece 4C and a fourth pole piece 4D. The first pole piece 4A, the second pole piece 4B, the third pole piece 4C and the fourth pole piece 4D are respectively disposed on the first permanent magnet 2A, the second permanent magnet 2B, the third permanent magnet 2C and the fourth permanent magnet 2D. The above settings have benefits as follows.

(1) Bilateral reverse magnetic fields with high strength are formed between the first pole piece 4A and the second pole piece 4B and between the third pole piece 4C and the fourth pole piece 4D, thereby achieving a bilateral drive through a high thrust.

(2) A distance between two adjacent permanent magnets is compressed by the corresponding two pole pieces in the pole piece assembly, thereby reducing a fluctuation degree of the magnetic field induction strength between the two permanent magnets facing towards each other. Therefore, the symmetry and uniformity of a distribution of the magnetic fields among the first pole piece 4A, the second pole piece 4B, the third pole piece 4C, and the fourth pole piece 4D are enhanced.

Referring to FIG. 1 to FIG. 9, the frame-type bilateral reverse permanent magnet direct current linear motor of the disclosure further includes a plurality of intermediate transition permanent magnet assemblies, which are disposed between the first iron yoke 1A and the middle iron yoke 6 and between the second iron yoke 1B and the middle iron yoke 6.

The plurality of intermediate transition permanent magnet assemblies are two groups of intermediate transition permanent magnet assemblies, one group of intermediate transition permanent magnet assemblies are disposed on two sides of a region between the first iron yoke 1A and the middle iron yoke 6 and serve as first intermediate transition permanent magnet assemblies, and the other group of intermediate transition permanent magnet assemblies are disposed on two sides of a region between the second iron yoke 1B and the middle iron yoke 6 and serve as second intermediate transition permanent magnet assemblies. In an illustrated embodiment, the first intermediate transition permanent magnet assemblies are two in number and the second intermediate transition permanent magnet assemblies are also two in number.

Figure 1:
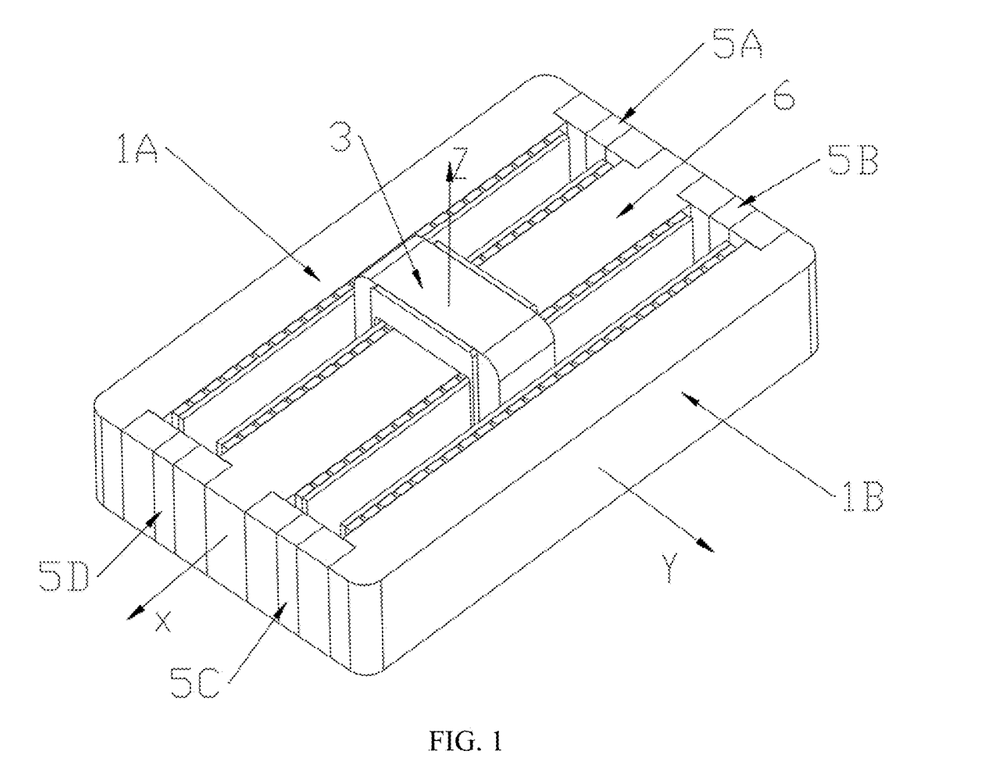
FIG. 1 illustrates a schematic structural diagram of a frame-type closed bilateral reverse permanent magnet direct current linear motor according to an embodiment of the disclosure.
Figure 2:
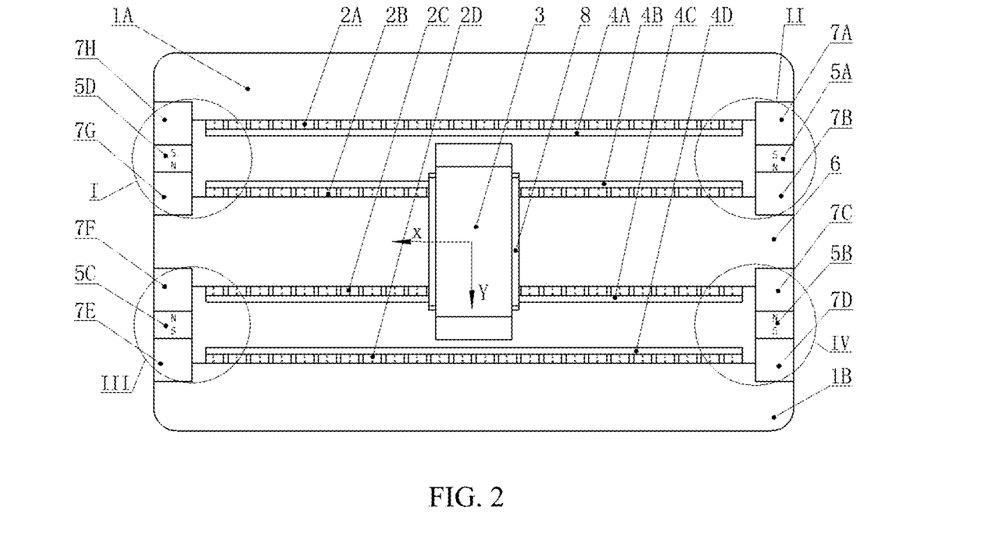
FIG. 2 illustrates a top view of the frame-type closed bilateral reverse permanent magnet direct current linear motor according to the embodiment of the disclosure.

Referring to FIGS. 2-6, the plurality of intermediate transition permanent magnet assemblies include transition permanent magnets (shown with 5A, 5B, 5D) and transition connection iron yokes (shown with 7A, 7B, 7C, 7D, 7E, 7F, 7G, 7H) respectively disposed on two sides of the transition permanent magnets (5A, 5B, 5C, 5D). In an illustrated embodiment, two sides of each of the transition permanent magnets (i.e., 5A as shown in FIG. 2) are provided with corresponding two transition connection iron yokes (i.e., 7A and 7B as shown in FIG. 2).

Figure 3:
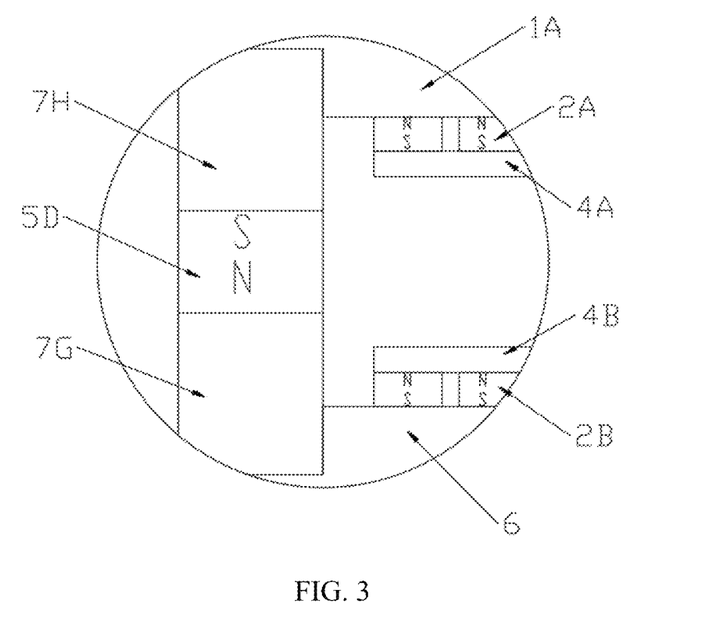
FIG. 3 illustrates a partial enlarged schematic diagram of part I shown in FIG. 2.
Figure 4:
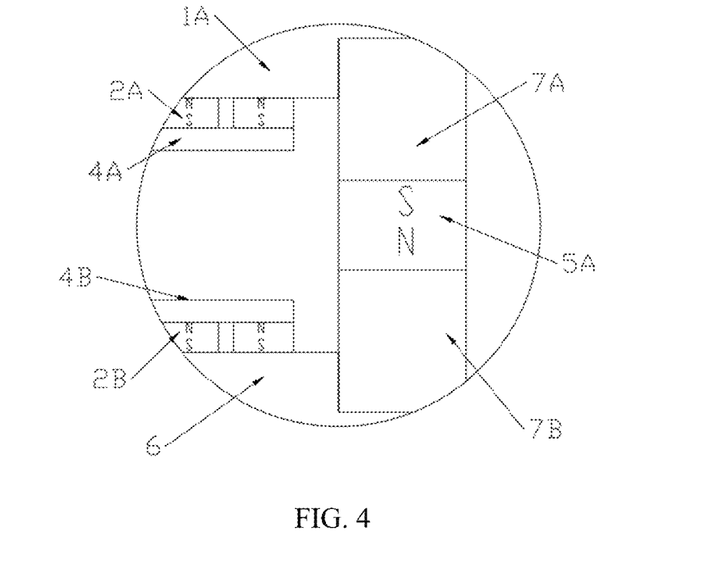
FIG. 4 illustrates a partial enlarged schematic diagram of part II shown in FIG. 2.

Referring to FIG. 3 to FIG. 4, four transition connection iron yokes (7A, 7B, 7G, 7H) respectively disposed on two sides of each of the two transition permanent magnets (5A, 5D) of the first intermediate transition permanent magnet assemblies are located between the first iron yoke 1A and the middle iron yoke 6 (i.e., each of the transition permanent magnets is provided with two corresponding transition connection iron yokes). Namely, the transition connection iron yoke 7A and the transition connection iron yoke 7B are connected to the two sides of the transition permanent magnet 5A; and the transition connection iron yoke 7G and the transition connection iron yoke 7H are connected to the two sides of the transition permanent magnet 5D.

Figure 5:
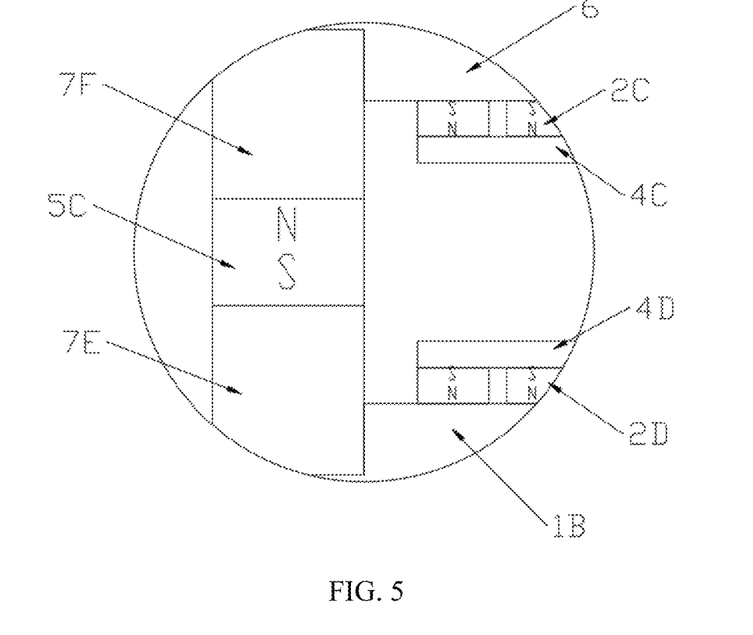
FIG. 5 illustrates a partial enlarged schematic diagram of part III shown in FIG. 2.
Figure 6:
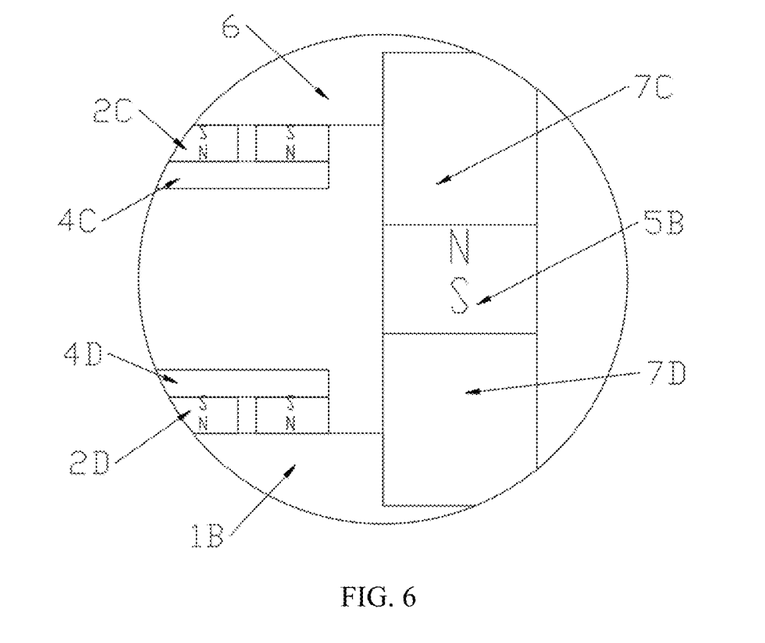
FIG. 6 illustrates a partial enlarged schematic diagram of part IV shown in FIG. 2.
Figure 7:
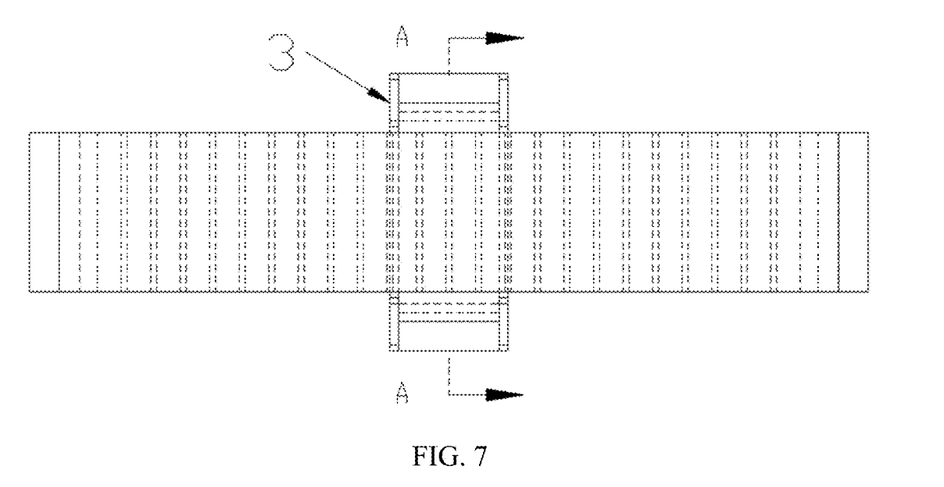
FIG. 7 illustrates a front view of the frame-type closed bilateral reverse permanent magnet direct current linear motor according to the embodiment of the disclosure.
Figure 8:
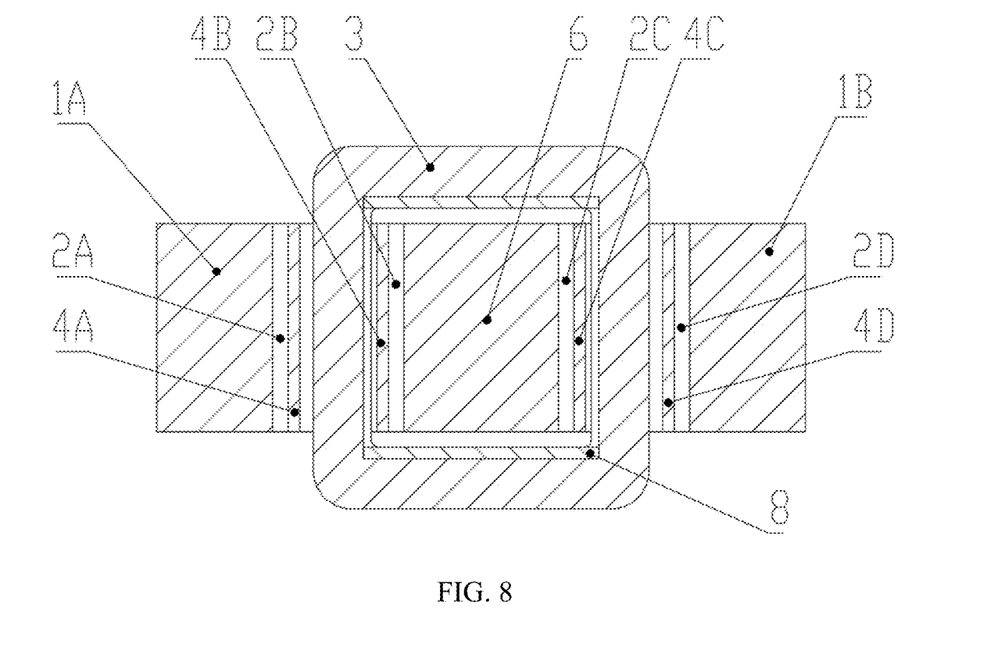
FIG. 8 illustrates a cross-sectional schematic diagram of the frame-type closed bilateral reverse permanent magnet direct current linear motor in a direction of A-A shown in FIG. 7.
Figure 9:
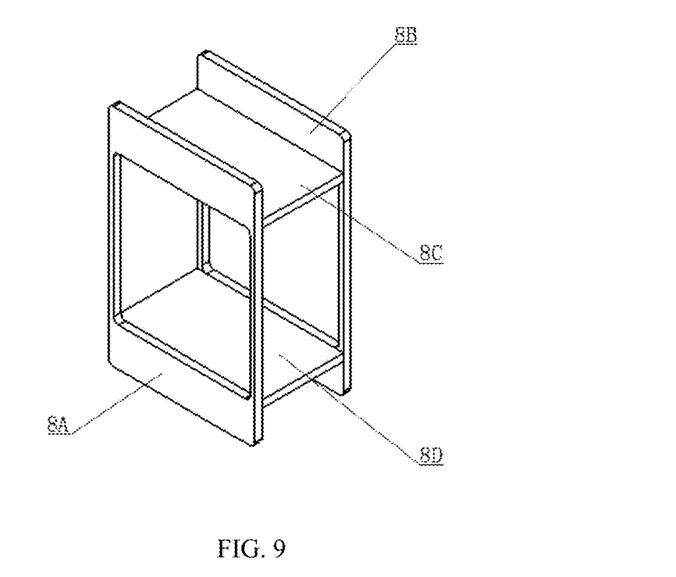
FIG. 9 illustrates a three-dimensional schematic structural diagram of a coil rack according to an embodiment of the disclosure.

Referring to FIG. 5 to FIG. 6, four transition connection iron yokes (7C, 7D, 7E, 7F) respectively disposed on two sides of each of the two transition permanent magnets (5B, 5C) of the second intermediate transition permanent magnet assemblies are located between the second iron yoke 1B and the middle iron yoke 6. Namely, the transition connection iron yoke 7C and the transition connection iron yoke 7D are connected to the two sides of the transition permanent magnet 5B; and the transition connection iron yoke 7E and the transition connection iron yoke 7F are connected to the two sides of the transition permanent magnet 5C.

Through the above settings, the magnetic circuit can be enhanced and transited, and meanwhile, the end effect is reduced. In addition, the machining technology of the motor provided by the disclosure is simplified, and the assembly precision and efficiency of the coil winding 3 are improved.

Referring to FIG. 1 to FIG. 9, magnetic pole orientations of the transition permanent magnets (5A, 5D) of the first intermediate transition permanent magnet assemblies are reverse to magnetic pole orientations of the transition permanent magnets (5B, 5C) of the second intermediate transition permanent magnet assemblies. The first intermediate transition permanent magnet assemblies are two in number, the two first intermediate transition permanent magnet assemblies are respectively located on the two sides of the region between the first iron yoke 1A and the middle iron yoke 6, and thereby the two first intermediate transition permanent magnet assembly, the first iron yoke 1A and the middle iron yoke 6 cooperatively form a closed frame structure. Accordingly, the second intermediate transition permanent magnet assemblies are two in number, the two second intermediate transition permanent magnet assemblies are respectively located on the two sides of the region between the second iron yoke 1B and the middle iron yoke 6, and thereby the two second intermediate transition permanent magnet assemblies, the second iron yoke 1 B and the middle iron yoke 6 cooperatively form another closed frame structure.

During assembling the motor provided by the disclosure, the permanent magnets of the permanent magnet group are first attached to the first iron yoke 1A, the second iron yoke 1B and two sides of the middle iron yoke 6, respectively; and then the pole pieces are disposed on the surfaces of the permanent magnets correspondingly. In an illustrated embodiment, the transition permanent magnet 5A and the two transition connection iron yokes (7A, 7B) form a whole, the transition permanent magnet 5B and the two transition connection iron yokes (7C, 7D) form a whole, the transition permanent magnet 5C and the two transition connection iron yokes (7E, 7F) form a whole, and the transition permanent magnet 5D and the two transition connection iron yokes (7G, 7H) form a whole.

Referring to FIG. 1 to FIG. 9, the support frame adopts an aluminum alloy frame, and therefore, the support frame is rigid and with a proper strength. In addition, the support frame is used for fixing the first iron yoke 1A, the second iron yoke 1B, the middle iron yoke 6, the transition permanent magnets (5A, 5B, 5C, 5D), and the transition connection iron yokes (7A, 7B, 7C, 7D, 7E, 7F, 7G, 7H). Furthermore, the iron yoke assembly, the transition connections iron yokes (7A, 7B, 7C, 7D, 7E, 7F, 7G, 7H) and the pole piece assembly are all made of a high-permeability soft-magnetic material; and the permanent magnet group and the transition permanent magnets (5A, 5B, 5C, 5D) are made of a high-coercivity hard-magnetic material and have magnetization directions being normal directions of surfaces with maximum surface areas.

Referring to FIG. 1 to FIG. 9, contact locations of the first iron yoke 1A, the second iron yoke 1B and the middle iron yoke 6 with the plurality of intermediate transition permanent magnet assemblies are provided with stepped grooves. The stepped grooves facilitate accurate positioning of the transition connection iron yokes (7A, 7B, 7C, 7D, 7E, 7F, 7G, 7H), thereby improving the assembly accuracy of the overall structure.

Referring to FIG. 1 to FIG. 9, the coil winding 3 includes a coil rack 8 and an enameled copper wire wound on the coil rack 8. The coil rack 8 is made of one of non-magnetically conductive materials; and in an illustrated embodiment, a stainless steel plate is selected. When a stainless steel sheet metal piece is used for welding and assembling, it is suggested to reduce welding spots or welding seams under the condition of ensuring rigidity and strength. The coil rack 8 includes a left vertical plate 8A, a right vertical plate 8B, an upper connecting plate 8C and a lower connecting plate 8D; and the left vertical plate 8A, the right vertical plate 8B, the upper connecting plate 8C and the lower connecting plate 8D together are welded together to form a frame structure. A length and a width of an inner hole of the coil rack 8 are both greater than a length and a width of a cross section of the middle iron yoke 6, respectively, thereby facilitating the coil rack 8 conveniently being taken out and being put in. In addition, a hollow structure is formed between the upper connecting plate 8C and the lower connecting plate 8D of the coil rack 8, thereby reducing an influence of the coil rack 8 on an air gap magnetic field among the pole pieces, and reducing the thrust fluctuation. The coil rack 8 is directly connected to a workbench, and the workbench is connected to a guide rail to ensure a single degree of freedom. Through the above settings, during the assembly, after the enameled copper wire is wound on the coil rack 8, the coil rack 8 is then sleeved on the middle iron yoke 6. Furthermore, the wholes formed by the transition permanent magnets (5A, 5B, 5C, 5D) and the corresponding transition connection iron yokes (7A, 7B, 7C, 7D, 7E, 7F, 7G, 7H) are aligned with the stepped grooves located on the first iron yoke 1A, the second iron yoke 1B and the middle iron yoke 6, respectively, and the stepped grooves are locked by screws to complete the assembly of the whole structure. It is noted that other components in direct contact with the direct current linear motor or adjacent components are made of a non-magnetic conductive material.

Referring to FIG. 1 to FIG. 9, in the frame-type bilateral reverse permanent magnet direct current linear motor of the disclosure, the first iron yoke 1A, the middle iron yoke 6, the transition connection iron yokes (7A, 7B, 7G, 7H), the transition permanent magnets (5A, 5D), the first permanent magnet 2A, the second permanent magnet 2B, the first pole piece 4A, and the second pole piece 4B together form a static uniform magnetic field B1 in an air gap between the first pole piece 4A and the second pole piece 4B, and a direction of the static uniform magnetic field B1 is directed by the second pole piece 4B to the first pole piece 4A (also referred to as a y-axis negative direction). The second iron yoke 1B, the middle iron yoke 6, the transition connection iron yokes (7C, 7D, 7E, 7F), the transition permanent magnets (5B, 5C), the third permanent magnet 2C, the fourth permanent magnet 2D, the third pole piece 4C and the fourth pole piece 4D together form a static uniform magnetic field B2 in an air gap between the third pole piece 4C and the fourth pole piece 4D, and a direction of the static uniform magnetic field B2 is directed by the third pole piece 4C to the fourth pole piece 4D (also referred to as a y-axis positive direction). The generated magnetic field B1 is opposite to the generated magnetic field B2 in the y-axis direction according to the above settings. However, a direction of a driving force generated by the magnetic field B1 on the coil winding 3 is consistent with that generated by the magnetic field B2 on the coil winding 3, thereby realizing bilateral driving.

In addition, the transition permanent magnets (5A, 5D) and the transition connection iron yokes (7A, 7B, 7G, 7H) are connected between the first iron yoke 1A and the middle iron yoke 6 to form a closed magnetic circuit for constraining a side magnetic circuit of the permanent magnet group. The transition permanent magnets (5B, 5C) and the transition connection iron yokes (7C, 7D, 7E, 7F) are connected between the second iron yoke 1B and the middle iron yoke 6 to form another closed magnetic circuit for constraining another side magnetic circuit of the permanent magnet group. The above settings make the machining technology of the motor provided by the disclosure feasible, make the assembly simple, and make the motor possess a function of enhancing the induction strength of the air gap magnetic field.

Figure 10:
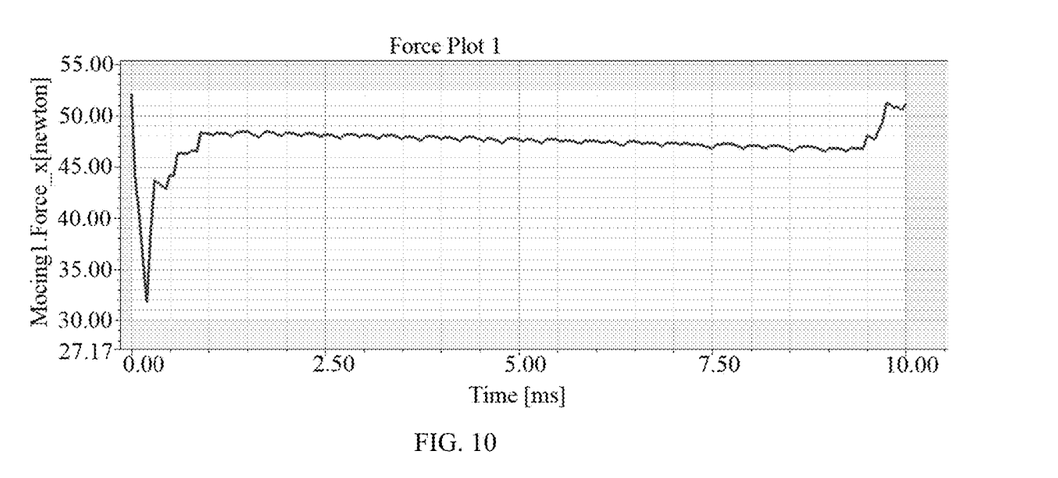
FIG. 10 illustrates a schematic diagram of an output thrust by connecting to a direct current of 1A according to an embodiment of the disclosure.

In addition, the disclosure is analyzed by means of a finite element electromagnetic module, a direct current of 1 ampere (A) is introduced into the coil winding 3, and an output thrust of the direct current is shown in FIG. 10 (an abscissa represents a time for introducing the direct current with a unit of millisecond, and an ordinate represents the output thrust with a unit of Newton). As shown in FIG. 10, the output thrust of the motor is basically constant at 47.3 N during its running process except that there is a fluctuation in the output thrust at the moment when the motor is started and stopped, and a relative fluctuation in the thrust shown in the whole curve is 1.8%, thereby indicating that the output thrust is stable.

Under a condition that the whole structure of the motor provided by the disclosure is not changed, the magnitude of the direct current in the coil winding 3 can be changed, thereby achieving an effect of adjusting the output thrust in proportion. In other words, when an orientation of the direct current in a coil of the coil winding 3 which uses to represent its length, uses i to represent direct current therein and uses n to represent its number of turns, is perpendicular to a magnetic field induction strength B (also referred to as an external magnetic field strength), the coil is subjected to an electromagnetic force F according to the left-hand rule, which is calculated by a formula as follows: $F=nBli$. The electromagnetic force is proportional to the direct current in the wire, the external magnetic field strength and the length of the wire, and also has good linearity.

Figure 11:
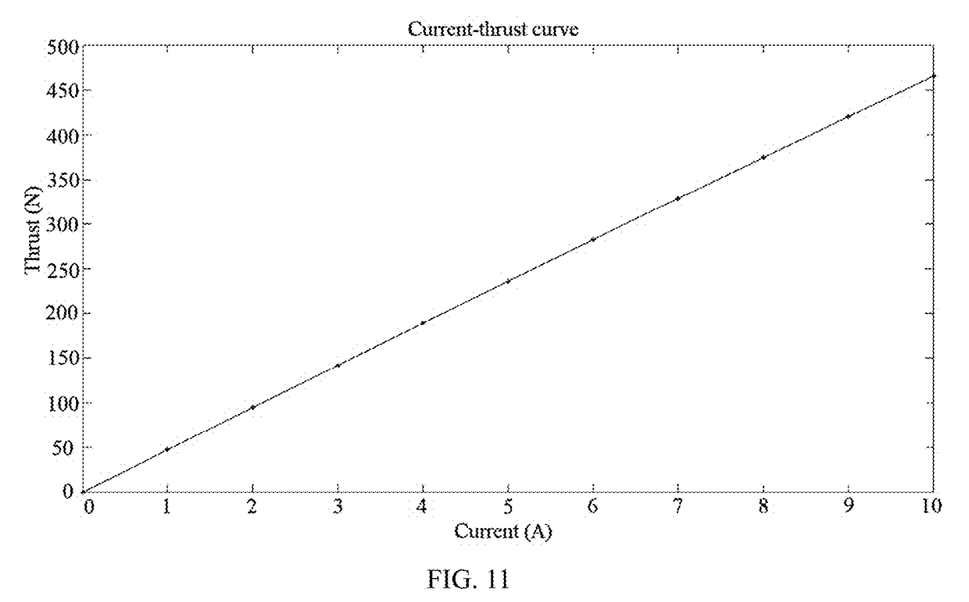
FIG. 11 illustrates a schematic diagram of a relationship curve between an input direct current and an output thrust according to an embodiment of the disclosure.

FIG. 11 illustrates a current-thrust curve obtained by introducing the direct current in a range of 0 A to 10 A into the coil winding 3 at a pitch of 1 A in the finite element. As shown in FIG. 11, an abscissa is denoted by the current value with a unit of ampere, and an ordinate is denoted by the output thrust with a unit of Newton; and it can be observed that the output thrust of the motor has good linearity and controllability.

The above description is the illustrated embodiment of the disclosure, but the embodiments of the disclosure are not limited by the above description, and any other change, modification, substitution, combination, and simplification made without departing from the spirit and principle of the disclosure should be regarded as equivalent replacement manners, which fall within the scope of the protection of the disclosure.

What is claimed is:

1. A frame-type bilateral reverse permanent magnet direct current linear motor, comprising:

a support frame, an iron yoke assembly disposed on the support frame, a permanent magnet group, a coil winding, and a pole piece assembly;

wherein the iron yoke assembly comprises: a first iron yoke, a second iron yoke and a middle iron yoke; the first iron yoke, the second iron yoke and the middle iron yoke are disposed in parallel pairwise; permanent magnets of the permanent magnet group are disposed between the first iron yoke and the middle iron yoke and between the second iron yoke and the middle iron yoke; pole pieces of the pole piece assembly are disposed on surfaces of the permanent magnets; and the coil winding is sleeved on the middle iron yoke;

the frame-type bilateral reverse permanent magnet direct current linear motor further comprising:

a plurality of intermediate transition permanent magnet assemblies, disposed between the first iron yoke and the middle iron yoke and between the second iron yoke and the middle iron yoke;

wherein the plurality of intermediate transition permanent magnet assemblies are two groups of intermediate transition permanent magnet assemblies, one group of intermediate transition permanent magnet assemblies are disposed on two sides of a region between the first iron yoke and the middle iron yoke and serve as first intermediate transition permanent magnet assemblies, and the other group of intermediate transition permanent magnet assemblies are disposed on two sides of a region between the second iron yoke and the middle iron yoke and serve as second intermediate transition permanent magnet assemblies;

wherein each of the plurality of intermediate transition permanent magnet assemblies comprises a transition permanent magnet and transition connection iron yokes respectively disposed on two sides of the transition permanent magnet, and the transition connection iron yokes respectively disposed on the two sides of the transition permanent magnet of each of the plurality of intermediate transition permanent magnet assemblies are located between the first iron yoke and the middle iron yoke or between the second iron yoke and the middle iron yoke; and a magnetic pole orientation of the transition permanent magnet of each of the first intermediate transition permanent magnet assemblies is reverse to a magnetic pole orientation of the transition permanent magnet of each of the second intermediate transition permanent magnet assemblies;

wherein the permanent magnets of the permanent magnet group comprise four permanent magnets respectively being a first permanent magnet, a second permanent magnet, a third permanent magnet and a fourth permanent magnet; the first permanent magnet is arranged opposite to the second permanent magnet, and magnetic poles on respective surfaces of the first permanent magnet and the second permanent magnet facing towards each other are different; the third permanent magnet is arranged opposite to the fourth permanent magnet, and magnetic poles on respective surfaces of the third permanent magnet and the fourth permanent magnet facing towards each other are different; and the first permanent magnet is disposed on the first iron yoke, the second permanent magnet is disposed on the middle iron yoke, the third permanent magnet is disposed on the middle iron yoke, and the fourth permanent magnet is disposed on the second iron yoke; and wherein a set of bilateral reverse uniform magnetic fields are formed between the first iron yoke and the middle iron yoke and between the second iron yoke and the middle iron yoke.

2. The frame-type bilateral reverse permanent magnet direct current linear motor according to claim 1, wherein the pole pieces of the pole piece assembly comprise a first pole piece, a second pole piece, a third pole piece and a fourth pole piece; and the first pole piece, the second pole piece, the third pole piece and the fourth pole piece are respectively disposed on the first permanent magnet, the second permanent magnet, the third permanent magnet and the fourth permanent magnet.

3. The frame-type bilateral reverse permanent magnet direct current linear motor according to claim 1, wherein contact locations of the first iron yoke, the second iron yoke and the middle iron yoke with the plurality of intermediate transition permanent magnet assemblies are provided with stepped grooves.

4. The frame-type bilateral reverse permanent magnet direct current linear motor according to claim 1, wherein the first intermediate transition permanent magnet assemblies are two in number, the two first intermediate transition permanent magnet assemblies are respectively located on the two sides of the region between the first iron yoke and the middle iron yoke, and thereby the two first intermediate transition permanent magnet assembly, the first iron yoke and the middle iron yoke cooperatively form a closed frame structure; and wherein the second intermediate transition permanent magnet assemblies are two in number, the two second intermediate transition permanent magnet assemblies are respectively located on the two sides of the region between the second iron yoke and the middle iron yoke, and thereby the two second intermediate transition permanent magnet assemblies, the second iron yoke and the middle iron yoke cooperatively form another closed frame structure.

5. The frame-type bilateral reverse permanent magnet direct current linear motor according to claim 1, wherein the support frame is an aluminum alloy frame.

6. The frame-type bilateral reverse permanent magnet direct current linear motor according to claim 1, wherein the coil winding comprises a coil rack and an enameled copper wire wound on the coil rack; and wherein the coil rack comprises: a left vertical plate, a right vertical plate, an upper connecting plate and a lower connecting plate; the left vertical plate, the right vertical plate, the upper connecting plate and the lower connecting plate are welded together to form a frame structure; and a length and a width of an inner hole of the coil rack are greater than a length and a width of a cross section of the middle iron yoke, respectively.

7. The frame-type bilateral reverse permanent magnet direct current linear motor according to claim 6, wherein the coil rack is made of a stainless steel plate.

* * * * *